United States Patent
Penumarthi et al.

(10) Patent No.: US 12,198,070 B2
(45) Date of Patent: Jan. 14, 2025

(54) OUTAGE PREDICTION IN FULL-STACK PERFORMANCE MONITORING SPACE

(71) Applicant: Zoho Corporation Private Limited, Chengalpattu Taluk (IN)

(72) Inventors: Satya Madhuri Penumarthi, Vijayawada (IN); Ramprakash Ramamoorthy, Maraimalai Nagar (IN); Shailesh Kumar Davey, Potheri (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 871 days.

(21) Appl. No.: 17/216,573

(22) Filed: Mar. 29, 2021

(65) Prior Publication Data

US 2021/0304037 A1    Sep. 30, 2021

Related U.S. Application Data

(60) Provisional application No. 63/140,154, filed on Jan. 21, 2021, provisional application No. 63/083,043, filed on Sep. 24, 2020.

(30) Foreign Application Priority Data

Mar. 31, 2020   (IN) .............................. 202041014230
Dec. 9, 2020    (IN) .............................. 202041053627

(51) Int. Cl.
*G06F 21/00*   (2013.01)
*G06N 5/02*    (2023.01)
*G06N 5/04*    (2023.01)
*G06N 20/00*   (2019.01)
*H04L 9/40*    (2022.01)

(52) U.S. Cl.
CPC ................. *G06N 5/04* (2013.01); *G06N 5/02* (2013.01); *G06N 20/00* (2019.01); *H04L 63/1425* (2013.01)

(58) Field of Classification Search
CPC . G06N 5/02; G06N 5/04; G06N 20/00; H04L 63/1425
See application file for complete search history.

(56) References Cited

U.S. PATENT DOCUMENTS

2018/0124097 A1*   5/2018   Tiwari ................ H04L 63/1425

* cited by examiner

*Primary Examiner* — Jeffrey C Pwu
*Assistant Examiner* — Thong P Truong
(74) *Attorney, Agent, or Firm* — Ahmann Kloke LLP (57) ABSTRACT

An effective strategy provides an intuitive starting point for an enterprise network agent to resolve issues before the issues increase the probability of an outage. Being able to predict whether and when a current anomalous state will transform into an outage is valuable to an enterprise network agent tasked with network administration, including monitoring the network; configuring the network; recommending software or hardware licenses, updates, or additions; obtaining software or hardware licenses or devices; generating reports and alerts; and launching countermeasures in association with the enterprise network.

19 Claims, 7 Drawing Sheets

OUTAGE PREDICTION IN FULL-STACK PERFORMANCE MONITORING SPACE

CROSS-REFERENCE TO RELATED APPLICATIONS

The present application claims priority to Indian Provisional Patent Application No. 202041014230 filed Mar. 31, 2020, Indian Provisional Patent Application No. 202041053627 filed Dec. 9, 2020, U.S. Provisional Patent Application Ser. No. 63/083,043 filed Sep. 24, 2020, and U.S. Provisional Patent Application Ser. No. 63/140,154 filed Jan. 21, 2021, which are hereby incorporated by reference herein.

BACKGROUND

In a robust enterprise network system, outages should be rare. Different types of outages impact downtime differently, but they all share a couple of characteristics in enterprise systems; they impact revenue directly and risk, causing damage to company reputation. An operations environment for predicting performance outages is intended to improve performance by reducing the frequency of outages. Complexity grows with customization and scale, which results in massive amounts of data accounting to a wide spectrum of behaviors. This is where machine learning can make a difference. This is an area of ongoing research and development with any measurable improvement to system performance being highly desirable.

SUMMARY

An effective strategy provides an intuitive starting point for an enterprise network agent to resolve issues before they increase the probability of an outage. Being able to predict whether and when a current anomalous state will transform into an outage is valuable to an enterprise network agent tasked with network administration, including monitoring the network; configuring the network; recommending software or hardware licenses, updates, or additions; obtaining software or hardware licenses or devices; generating reports and alerts; and launching countermeasures in association with the enterprise network.

DETAILED DESCRIPTION

Figure 1:
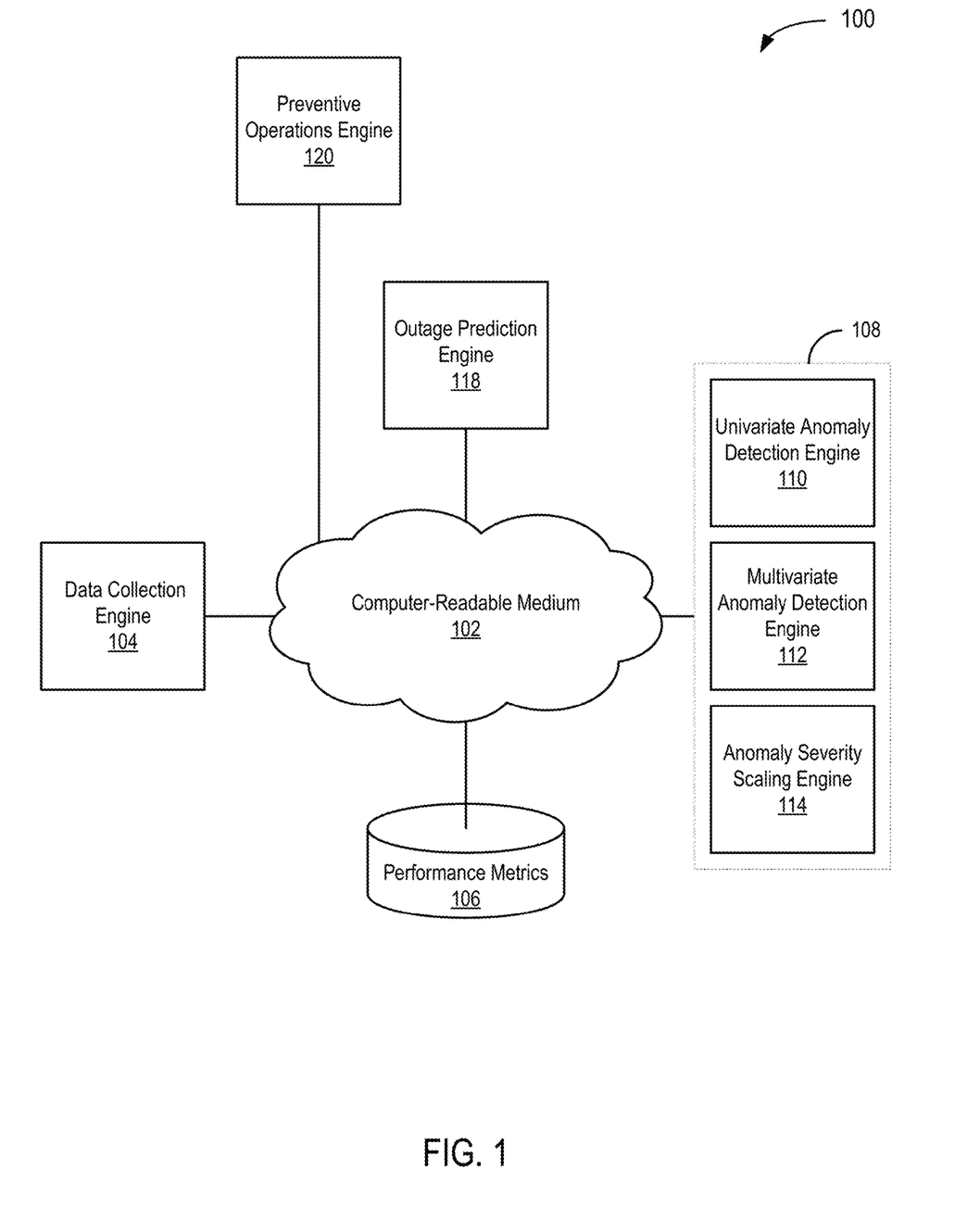
FIG. 1 depicts a diagram of an example of a system for developing preventive operations procedures for response to potential outages.

FIG. 1 depicts a diagram 100 of an example of a system for developing preventive operations procedures for response to potential outages. The diagram 100 includes a computer-readable medium (CRM) 102, a data collection engine 104 coupled to the CRM 102, a metrics datastore 106 coupled to the CRM 102, a system behavior detection engine 108 coupled to the CRM 102, an outage prediction engine 118 coupled to the CRM 102, and a preventive operations engine 120 coupled to the CRM 102. The system behavior detection engine 108 includes a univariate anomaly detection engine 110, a multivariate anomaly detection engine 112, and an anomaly severity scaling engine 114.

The CRM 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is co-located on one device and a second component is located on a different device, the CRM 102 can include a wireless or wired back-end network or LAN. The CRM 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloudbased datastore is a datastore that is compatible with cloud-based computing systems and engines.

Returning to the example of FIG. 1, the data collection engine 104 is intended to represent an engine for collecting metrics for full-stack performance monitoring. In a specific implementation, data collection includes episodes collected before previous outages, which are used for learning behavior with respect to attributes during a training (or update) phase of a pre-outage behavior model (and those collected before critical anomalies during an inference phase). Episodes include a subset of events observed within a contextual time frame determined based on metric collection intervals. Each episode is a collection of metrics of a duration 'd' for attributes that describe a current system state.

The metrics datastore 106 is intended to contain metrics collected by the data collection engine 104 and also but not limited to represent data structures associated with episodes. The metrics datastore 106 and other datastores described in this paper can have a corresponding engine to create, read, update, or delete (CRUD) data structures. While not shown in FIG. 1, these engines may or may not be described in association with other figures to illustrate relevant functionality. In a specific implementation, an episode is composed of its attributes along with those of related data collection engines over a duration of 't(*)-d' hours.

Figure 2:
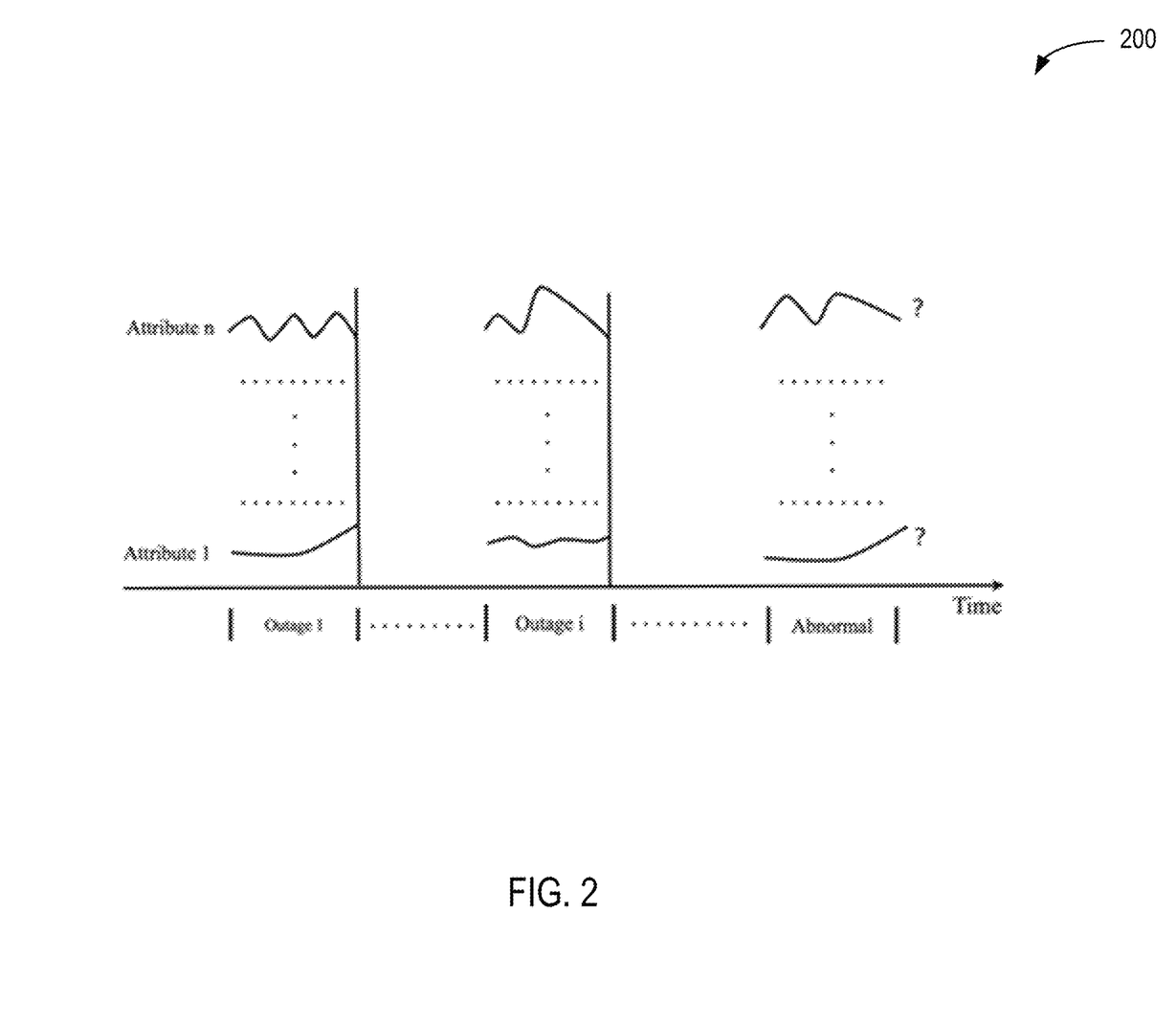
FIG. 2 is a diagram of a conceptual visualization of episodes before outages as signals.

FIG. 2 is a diagram 200 of a conceptual visualization of episodes before outages as signals.

Figure 3:
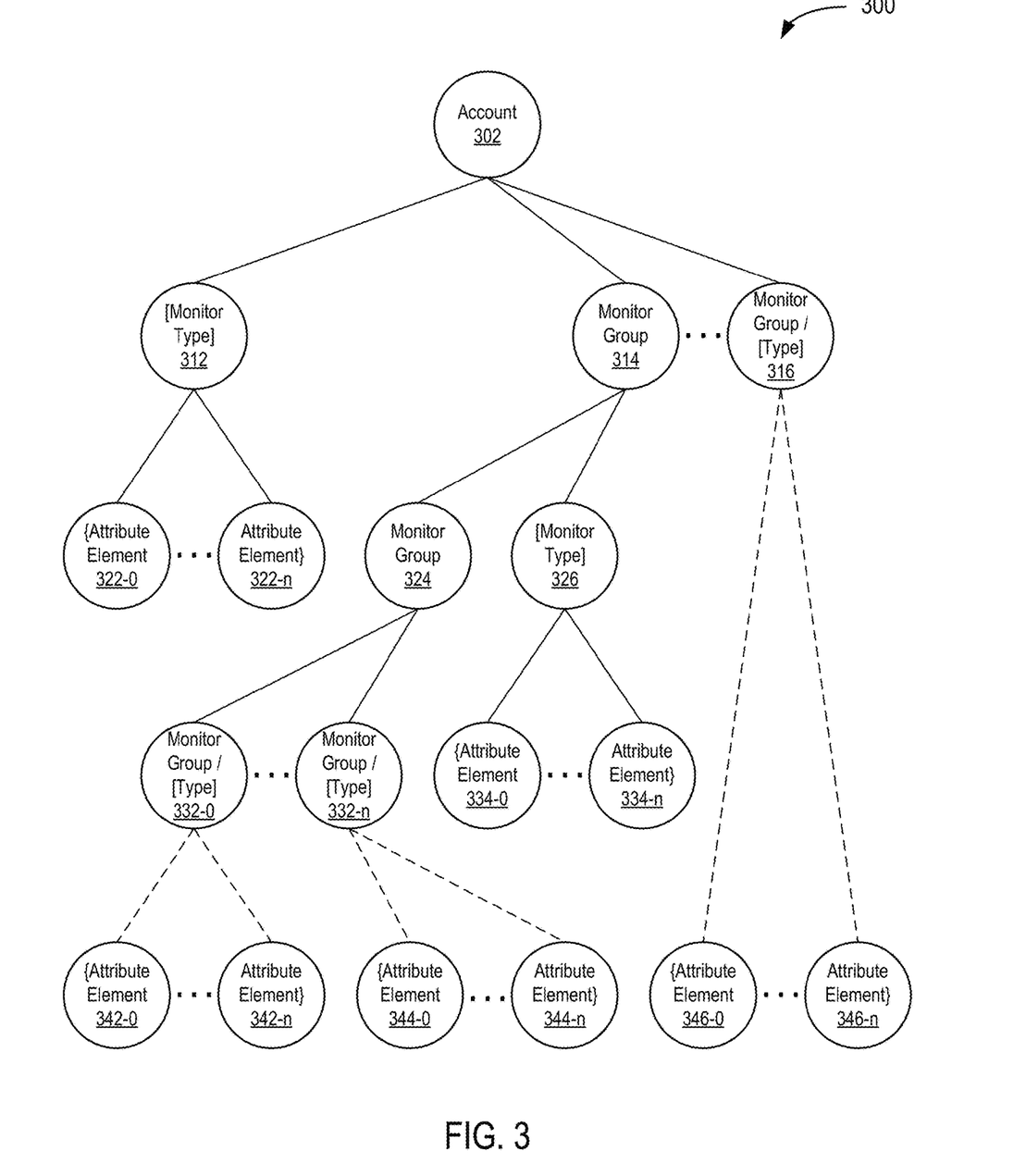
FIG. 3 is a diagram of a conceptual illustration of an episode tree data structure with a set of linked nodes.

FIG. 3 is a diagram 300 of a conceptual illustration of an episode tree data structure with a set of linked nodes. Assume, upon mining through a wide range of episode patterns before recorded outages with domain insight, it has been found an outage can follow either a severe rise or fall. A tree with infrastructure levels as internal nodes and time series corresponding to attributes as leaf nodes serves as a reference topology for entity pattern matching. Advantageously, this design is compatible with dynamically changing infrastructure components.

The diagram 300 includes a root (account) node 302, a monitor type node 312 coupled to the root node 302, a monitor group node 314 coupled to the root node 302, a monitor group/type node 316 coupled to the root node 302, an attribute element node 322-0 to an attribute element node 322-n (collectively, the attribute elements 322) coupled to the monitor type node 312, a monitor group node 324 coupled to the monitor group node 314, a monitor type node 326 coupled to the monitor group node 314, a monitor group/type node 332-0 to a monitor group/type node 332-n (collectively, the monitor group/type nodes 332), an attribute element node 334-0 to an attribute element node 334-n (collectively, the attribute element nodes 334) coupled to the monitor type node 326, an attribute element node 342-0 to an attribute element node 342-n (collectively, the attribute element nodes 342) coupled to the monitor group/type 332-0, an attribute element node 344-0 to an attribute element node 344-n (collectively, the attribute element nodes 344) coupled to the monitor group/type node 332-n, and an attribute element node 346-0 to an attribute element node 346-n (collectively, the attribute element nodes 346) coupled to the monitor group/type node 316. The various different nodes are provided for illustrative purposes but, in general, a root node is for an account or a monitor type or a monitor group, purely subject to application, and a leaf node is for an attribute element; non-leaf subtrees can have a monitor type node, a monitor group node, and/or a monitor group/monitor type node as a parent node. The value 'n' of each set of attribute elements can vary with monitor type.

In a specific implementation, the episodes tree data structure can be characterized as a model layout in which each level (represented by the 10's place of the reference numerals, such as '314' representing a node in the first level after the root and '322' representing a node in the second level after the root) is a hub of patterns its children exhibited in previous confirmed outages. In this specific implementation, a leaf represents a functional unit (engine and datastore) that computes, updates, and holds slope statistics of abnormal behaviors.

Figure 4:
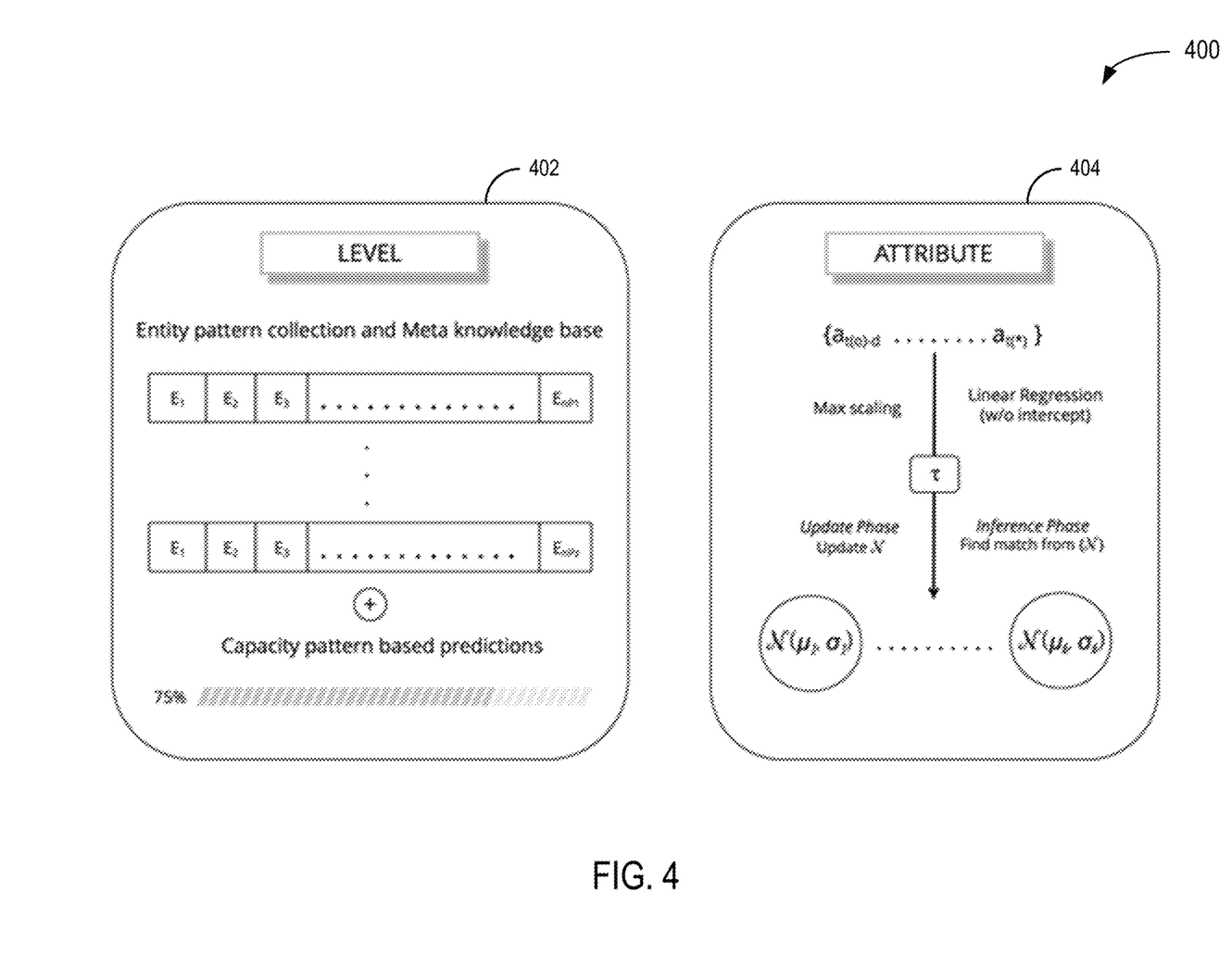
FIG. 4 is a diagram illustrating a situation that would lead to an outage if a leaf node lights up with a match.

FIG. 4 is a diagram 400 illustrating a situation that would lead to an outage if a leaf node lights up with a match. The diagram 400 includes a level 402 with functional constituents wherein "E" denotes an entity (Monitor type/group), "n" is the number of entities in each unique pattern "P" and there can be "z" such patterns within a given level; and an attribute 404 wherein "a" denotes each attribute collected from "d" instants back in time from "t". During Update phase, "t(*)" is the time at start point of downtime and is of a reported high risk anomaly during Inference phase. "τ" is the equivalent using which possible "k" distributions are maintained. For the sake of simplicity, capacity notations are not mentioned here.

In a specific implementation, a time series (actual metric of attribute) is modelled by linear regression without intercept using least squares approximation. Slopes estimated are thereafter used to create and maintain normal distribution(s). Continuous learning over time is effectuated with ease as Gaussian mixture models based on Expectation Maximization are employed. Incoming episodes are pre-processed in the same way and checked to determine if the current slope fits into any of the pre-existing slope distributions (within 2 standard deviations). This current situation would lead to an outage if any of the leaf nodes light up with a match. Given a probable fit, the cost of current episode curve to superimpose onto corresponding cluster equivalent in slope space translates to time units. Let regression function of the befitting cluster equivalent be f(t) and that of current episode be g(t).

Figure 5:
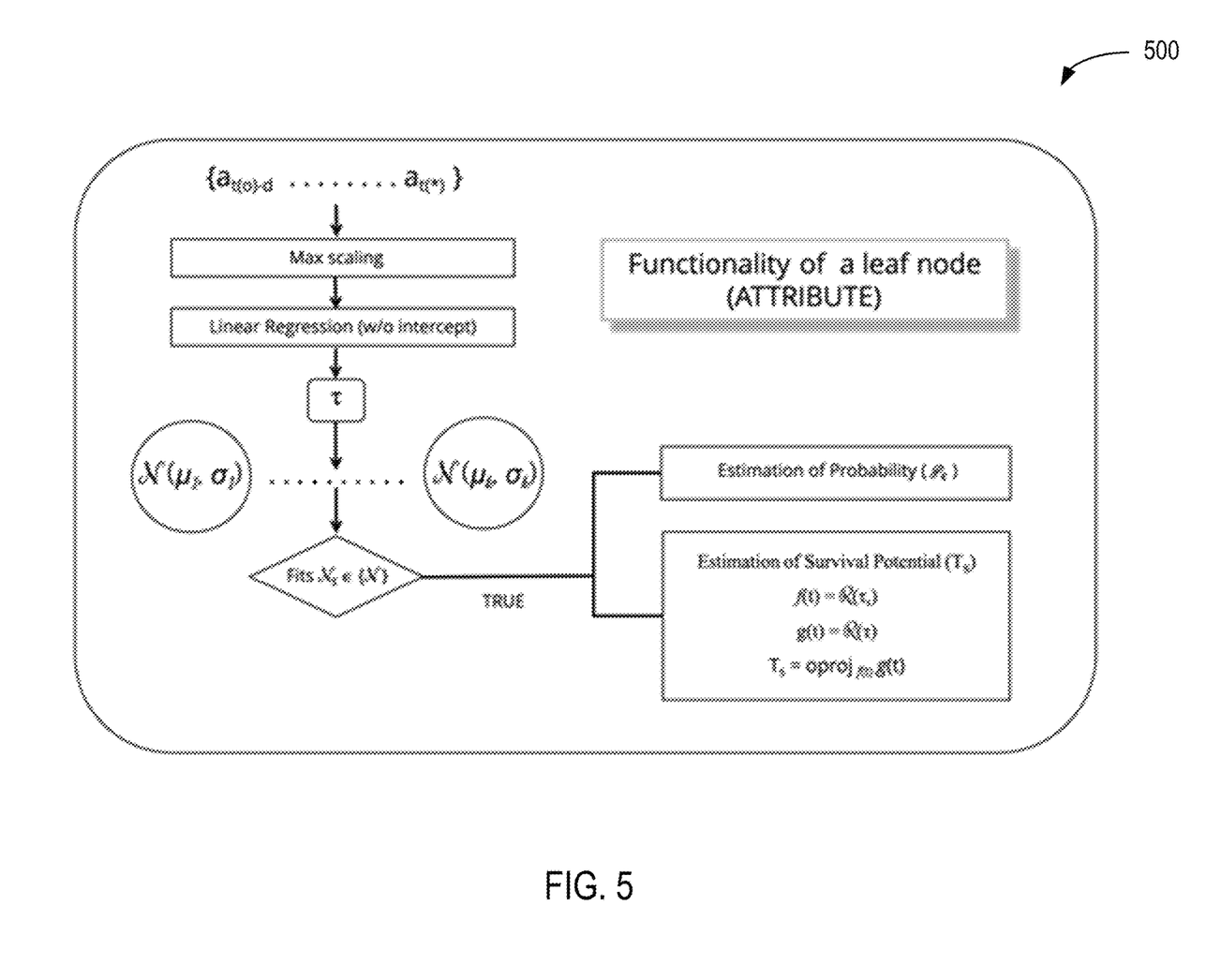
FIG. 5 is a diagram illustrating functionality of a leaf node and the magnitude of rejection of g(t) from f(t) giving the time left for mitigation.

FIG. 5 is a diagram 500 illustrating the magnitude of rejection of g(t) from f(t) that gives the time left for mitigation, "$T_s$," named as Survival potential at elementary level. Mathematically, $T_s = oproj_{f(t)} g(t)$. Thereafter, an overall deadline can also be deduced by consolidating time units estimated for individual entities (survival potentials of all predicted attributes) with severity and the effect spread (vulnerability). It is essentially the minimum of survival potentials across infrastructure entities/groups upon scrutinizing capacity.

Referring once again to the example of FIG. 1, the system behavior detection engine 108 is intended to represent an engine that classifies current system behavior (system state) relative to known system behaviors and assesses risk associated with such system states. In a specific implementation, analytics are used to ensure an operations environment can maintain performance. Complexity grows with customization and scale, which in turn generates a spectrum of user behavior profiles. Outages may be rare and are not comparable among users, but downtime associated with each type of outage typically hits revenue directly and can be damaging to reputation. Advantageously, an administrator of an enterprise can be provided an intuitive starting point for resolving issues before they lead to a potential outage. Predicting if current anomalous state would transform into an outage can help in making informed decisions or trigger remediation. Outage-related information is any data useful to a human or artificial agent of a system at risk of outages for the purpose of understanding a cause and effect of an outage and how to prevent an outage in the future.

The system behavior detection engine 108 includes a univariate anomaly detection engine 110, a multivariate anomaly detection engine 112, and an anomaly severity scaling engine 114. In a specific implementation, univariate anomaly detection is based on robust principal component analysis (RPCA) improved to handle seasonal patterns and yield explainable results. For example, the univariate anomaly detection engine 110 generates an expected value (representing normal behavior) by tracing back internal estimates when an anomaly is observed, which also aids in grouping anomalies by severity. RPCA is a modification of principal component analysis (PCA) which works well with respect to grossly corrupted observations.

Multivariate anomaly architecture is designed using concepts from online matrix sketching to provide a streaming ready explanation generating lifetime model, wherein a live sketch is maintained as a snapshot that serves as a reduced representation of normal system behavior patterns (which include seasonal nature of system states as well). For example, for a given set of attributes as a vector at a given time, the multivariate anomaly detection engine 112 detects deviations from a behavior model for a system (state) along with identifying contributing factors using directional evaluation as a part of projection analysis.

The anomaly severity scaling engine 114 categorizes anomalies by severity. In a specific implementation, severity includes three thresholds (e.g., anomalous, critical, and catastrophic), but a different number of thresholds can be used as is deemed appropriate for a specific implementation, which may or may not be based upon a risk matrix. In operation, an episode (e.g., a current or recent episode) is extracted to further predict odds of a subsequent potential outage.

In a specific implementation, a pre-marking technique called a Deflection Ratio is employed to mark hidden risk-associated attributes while updating an outage prediction model with episodes before confirmed outages. A duration of time (e.g., a few hours) after the outage may also be taken into consideration for this purpose. Drastic change in any of the attributes (before and after an outage) is captured by thresholding on rate of change in variance. In a specific implementation, high risk anomalies (e.g., critical or catastrophic anomalies), when detected, can generate an alert for a human or artificial agent in order to enable preparation, countermeasures, or the like.

Figure 7:
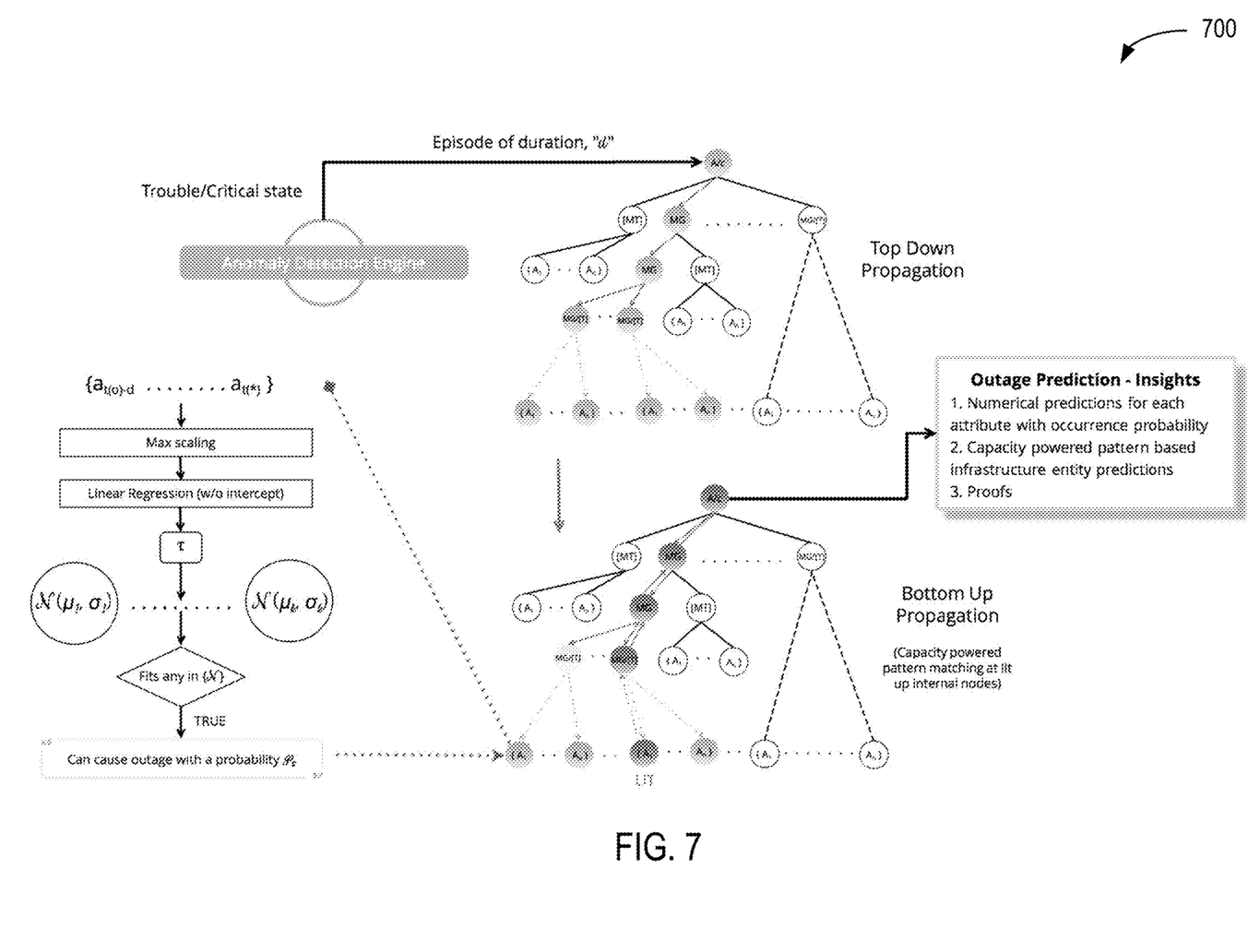
FIG. 7 is a diagram illustrating the inference phase of an outage prediction model.

The outage prediction engine 118 is intended to represent an engine that provides capacity powered pattern-based infrastructure entity predictions. The outage prediction engine is for outage prediction and further analytics upon detecting aberrations. In a specific implementation, utilizing an outage prediction model comprises three phases: a train phase, an update phase, and an inference phase. A model is created with infrastructure topology using the first confirmed outage, i.e., with individual attribute episodes before and after downtime during the train phase. Every next confirmed outage is used to update this created model, which internally keeps the normal distribution on slopes updated. When any of the attributes are identified as associated with risk of outage, an episode is collected to infer from the pre-outage behavior model, as shown in FIG. 7, for prediction. In a real-time environment, every consecutive high-risk episode is used to infer from the outage prediction model until the issue gets resolved or there is a confirmed prediction.

Advantageously, the outage prediction engine 118 generates numerical predictions for each attribute with occurrence probability, plus proofs. The prediction is explanation ready as it has all the attributes that could contribute to the current situation leading to a potential outage along with the chance of contributing. This information can serve as a starting point of root cause analysis and significantly reduces the mean time to detect (MTTD), investigate (MTTI) and resolve (MTTR) an outage when evaluated in production decoupling auto-remediation. Apart from having a model limited to an account, a global model per each monitor type and also but not limited to similar users or infrastructures, can be maintained to predict outages for new users. Minor tweaks include down-toning capacity influence.

The preventive operations engine 120 is intended to represent an engine for alerting human or artificial agents of a predicted outage risk. Providing the time left for mitigation along with possible solutions can prepare for a predicted outage or, ideally, act to prevent the outage, thereby making the environment proactive. For example, if an outage is predicted it may be possible to spin up new servers.

Figure 6:
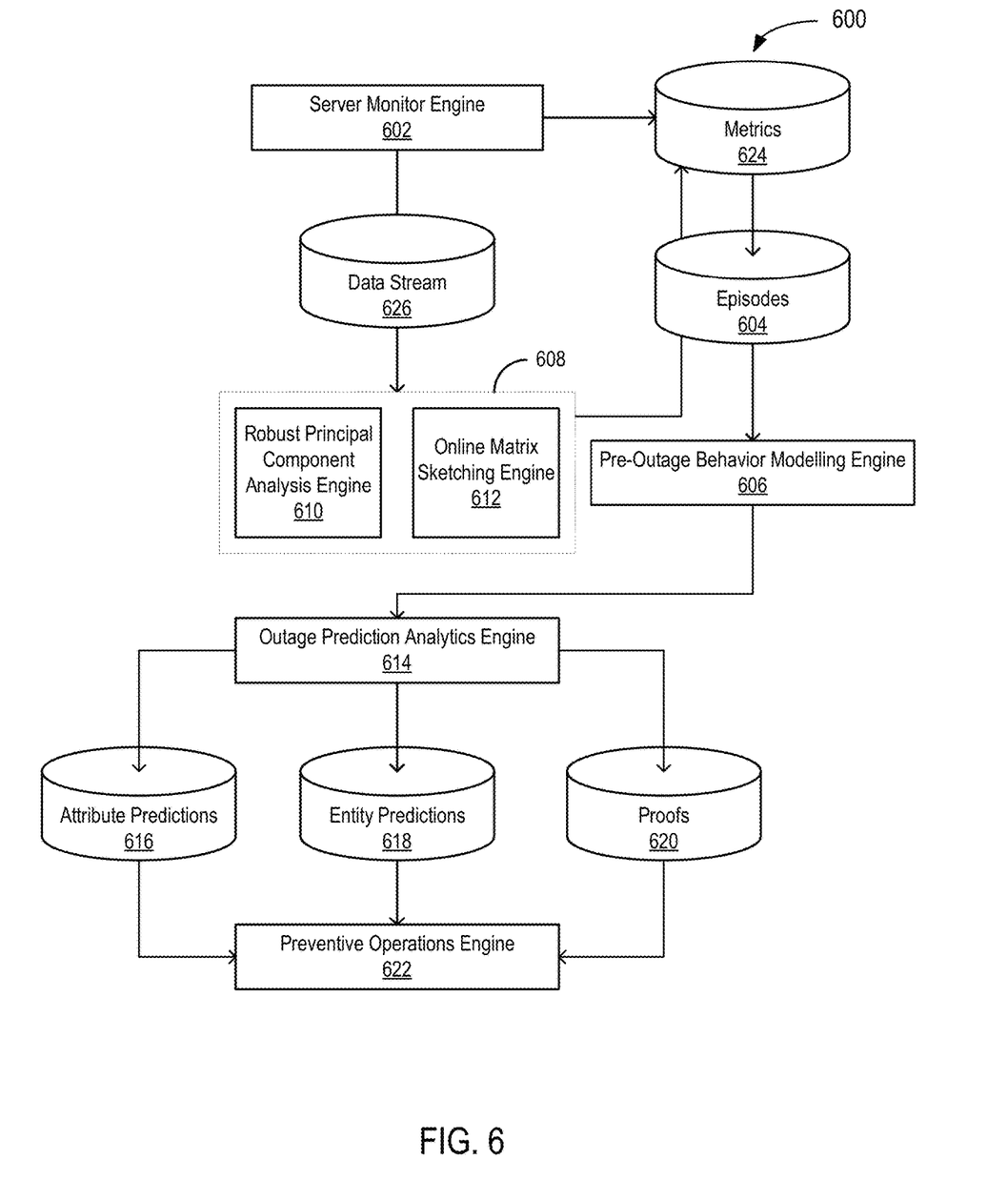
FIG. 6 is a diagram of an example of a system for building a robust server behavior model.

FIG. 6 is a diagram 600 of an example of a system for building a robust server behavior model. The diagram 600 includes a server monitor engine 602, a metrics datastore 624 coupled to the server monitor engine 602, a data stream 626 coupled to the server monitor engine 602, an episodes data store 604 coupled to the metrics datastore 624, a pre-outage behavior modelling engine 606 coupled to the episodes datastore 604, a univariate and multivariate anomaly detection and severity scaling engine 608 coupled to the data stream datastore 626 and the metrics datastore 624, an outage prediction analytics engine 614 coupled to the univariate and multivariate anomaly detection and severity scaling engine 608, an attribute predictions datastore 616 coupled to the outage prediction analytics engine 614, an entity predictions datastore 618 coupled to the outage prediction analytics engine 614, a proofs datastore 620 coupled to the outage prediction analytics engine 614, and a preventive operations engine 622 coupled to the attribute predictions datastore 616, the entity predictions datastore 618, and the proofs datastore 620. In the example of FIG. 6, the univariate and multivariate anomaly detection and severity scaling engine 608 includes a robust principal component analysis (RPCA) engine 610 and an online matrix sketching engine 612.

The server monitor engine 602 is intended to represent a full-stack performance monitor of events associated with a server. Depending upon the implementation, a server can include an application server, database server, file server, mail server, web server, or some other hardware or service. In a specific implementation, the server monitor engine 602 detects events that are later used to understand resource usage patterns.

The episodes datastore 604 includes a subset of events used for outage prediction. Other events may or may not be used for other purposes, such as aiding a systems administrator to understand system operations or aiding in other aspects of administration or management. Thus, the episodes datastore 604 could be considered part of a more general events datastore (not shown).

The pre-outage behavior modelling engine 606 is intended to contain clustered collections of behaviors before various outages that occurred in the past and subengines for generating and updating a pre-outage behavior model (which can be characterized as a datastore). There can be multiple different thresholds of increasing risk (e.g., nominal, moderate, critical, catastrophic, or the like) that may trigger different responses. What is considered a key metric for episode utilization, whether it be CPU utilization, disk utilization, server load, traffic characteristics, syslog errors, event logs, or the like, will depend upon results yielded by the system behavior detection engine, which includes the univariate anomaly detection engine, multivariate anomaly detection engine, and the severity scaling engine coupled with the metrics datastore for ingestion of relevant data.

Univariate and multivariate anomaly detection engines function independently from an outage prediction engine (see, e.g., FIG. 1, univariate anomaly detection engine 110, multivariate anomaly detection engine 112, outage prediction engine 118). They learn normal behavior so as to spot aberrations while the latter does not learn any normal system behavior and instead gains knowledge from abnormal patterns. The univariate and multivariate anomaly detection and severity scaling engine 608 is intended to represent an engine that determines whether a set of key metrics deviates from system's normal behavior and the pre-outage behavior modelling engine 606 generates the odds of an outage. In operation, the univariate and multivariate anomaly detection and severity scaling engine determine metrics that behave abnormally, after which the outage prediction model speculates if such stage could lead to a potential outage, relative to already learnt episodes.

The RPCA engine 610 generates an expected value (representing normal behavior) by tracing back internal estimates when an anomaly is observed, which also aids in grouping anomalies by severity. In a specific implementation, an idealized version of RPCA is used to recover a low-rank matrix $L_0$ from highly corrupted measurements $M=L_0+S_0$; the decomposition in low-rank and sparse matrices can be achieved by techniques such as Principal Component Pursuit (PCP), Stable PCP, Quantized PCP, Block based PCP, and Local PCP. In a specific implementation, Iteratively Reweighted Least Squares (IRLS) optimization is used; alternatives include, but are not necessarily limited to, Augmented Lagrange Multiplier Method (ALM), Alternating Direction Method (ADM), and Fast Alternating Minimization (FAM). Seasonality is ironed out by framing the initial matrix for RPCA with seasonal frequency, detected using Fourier analysis and validated using Singular Spectrum Analysis (most predominant frequency from the seasonality profile generated), as a dimension. This is limited to scenarios wherein any predominant valid frequency exists, otherwise the dimensions of initial matrix shall be those prime numbers whose product remain closest to total number of instants being modeled at any point of time.

The online matrix sketching engine 612 is intended to represent an unsupervised anomaly detection framework that can detect anomalies in a data stream. The models have further reinforcement learning capabilities. Due to the massive amount of data that can be generated by a server, it may be desirable to limit storage utilization. In a specific implementation, the online matrix sketching engine 612 maintains a relatively small set of orthogonal vectors that form a good approximate basis for observed data.

The outage prediction analytics engine 614 is intended to represent an engine that provides information to a human or artificial agent relative to but not limited to pattern-capacity combinations and proofs. The information can be provided in a report that draws from various types of data including numerical predictions for each attribute with occurrence probability (represented by the attribute predictions datastore 616), capacity powered pattern based infrastructure entity predictions (represented by the entity predictions datastore 618), and proofs (represented by the proofs datastore 620). Zero configuration workflow intends to discount decisions like thresholds and severity definitions that could vary with context and infrastructure. In other words, the user will be able to benefit just by enabling this detection-prediction system without any pre-settings.

The preventive operations engine 622 is intended to represent an engine that prompts human or artificial agents to act to prevent an outage when the outage is predicted. The preventive operations are aspirational in the sense that the operations may not always result in the prevention of an outage, though they will prevent an outage, or at least ameliorate the harm of an outage, in at least some instances.

The invention claimed is:

1. A system comprising:
one or more processors; and
memory storing instructions that, when executed by the one or more processors, cause the system to perform:
monitoring, by a monitoring engine, a data stream to obtain episodes observed within a time frame determined based on metric collection intervals, wherein the episodes are formed from a subset of key metrics associated with system behavior, wherein the key metrics are stored in a metrics datastore coupled to the monitoring; engine
performing, by a system behavior detection engine comprising a univariate anomaly detection engine, a multivariate anomaly detection engine, and a severity scaling engine coupled to the metrics datastore, multivariate anomaly detection, and severity scaling on the key metrics to identify anomalous behavior within the subset of the key metrics learning from the episodes to generate a pre-outage behavior model, wherein an episodes datastore is coupled to the metrics datastore, wherein the episodes datastore includes episodes formed from a subset of the key metrics, and wherein the episodes are observed within a time frame determined based on metric collection intervals;

providing, by an outage prediction engine comprising a pre-outage behavior modelling engine, an outage prediction analytics engine, and a preventive operations engine, coupled to the episodes datastore, outage-related information associated with the subset of the key metrics;

identifying, by the system behavior detection engine, the subset of the key metrics exhibiting anomalous behavior, after which the outage prediction engine determines outage-related information;

wherein the univariate anomaly detection engine includes a robust principal component analysis (RPCA) engine that handles seasonal and trend components, and generates an expected value by tracing back internal estimates when an anomaly is observed.

2. The system of claim 1 wherein the monitoring engine provides a data stream to the system behavior detection engine and thereafter to the outage prediction engine via the episodes datastore as a zero configuration workflow.

3. The system of claim 1 wherein the multivariate anomaly detection engine includes an online matrix sketching engine that detects anomalies associated with an abnormal state in a multivariate data stream and identifies metrics that are contributing to the abnormal state.

4. The system of claim 1 wherein the outage prediction analytics engine provides information to a human or artificial agent relative to past episodes from learnings incorporated into the pre-outage behavior model.

5. The system of claim 1 wherein the outage prediction engine includes an attribute prediction engine that generates numerical predictions for each attribute with occurrence probability.

6. The system of claim 1 comprising:

an entity prediction engine, coupled to the outage prediction analytics engine, that generates capacity powered pattern based infrastructure entity predictions, wherein the outage prediction analytics engine provides a report to a human or artificial agent that includes a subset of the capacity powered pattern based infrastructure entity predictions.

7. The system of claim 1 comprising:

a proofs datastore, coupled to the outage prediction analytics engine, that includes proofs, wherein the outage prediction analytics engine provides a report to a human or artificial agent that includes a subset of the proofs.

8. The system of claim 1 comprising a preventive operations engine, coupled to the outage prediction analytics engine, that prompts human or artificial agents to act to prevent an outage when the outage is predicted, by providing possible proactive measures as executable scripts.

9. The system of claim 1 comprising a data collection engine that collects metrics for full-stack performance monitoring, wherein data collection includes the key metrics to extract the episodes, collected before previous outages, which are used for learning behavior with respect to attributes during a training or update phase of the pre-outage behavior modelling engine.

10. The system of claim 1 comprising a data collection engine that collects metrics for full-stack performance monitoring, wherein data collection includes the key metrics to extract the episodes, collected before critical anomalies during an inference phase, for use by the outage prediction engine to generate outage predictions.

11. The system of claim 1 comprising a data collection engine that collects metrics for full-stack performance monitoring, wherein data collection includes the episodes and each episode is a collection of metrics of a duration 'd' for attributes that describe a current system state.

12. The system of claim 1 wherein the outage prediction engine uses deflection ratio to mark hidden risk-associated attributes before updating an outage prediction model with at least a subset of the key metrics before at least a subset of confirmed outages, wherein drastic change in an attribute is captured by thresholding on rate of change in variance after downtime.

13. The system of claim 1 wherein the outage prediction analytics engine approximates survival potential time before an outage happens at metric level, individual component level, and consolidated infrastructure level.

14. The system of claim 1 wherein the outage prediction engine models episode behavior using slope statistics.

15. The system of claim 1 wherein an entity prediction engine generates capacity powered pattern based infrastructure entity predictions applicable to simple to deep infrastructures and nested infrastructures.

16. The system of claim 1 accommodating dynamically changing infrastructure components seamlessly by allowing and handling both addition and deletion of monitoring entities without affecting previous pattern learnings and incorporating new relationships thereafter as a zero configuration continuous process.

17. The system of claim 1 wherein the outage prediction engine predicts an outage that has different characteristics than past outage occurrences.

18. A method comprising:

monitoring, by one or more computers, a data stream to obtain episodes observed within a time frame determined based on metric collection intervals, wherein the episodes are formed from a subset of key metrics associated with system behavior;

performing univariate anomaly detection, multivariate anomaly detection, and severity scaling on the key metrics to identify anomalous behavior within the subset of the key metrics learning from the episodes to generate a pre-outage behavior model;

providing outage-related information associated with the subset of the key metrics;

identifying the subset of the key metrics exhibiting anomalous behavior, after which the outage prediction engine determines outage-related information;

handling seasonal and trend components and generating an expected value by tracing back internal estimates when an anomaly is observed.

19. A system comprising:

one or more processors; and memory storing instructions that, when executed by the one or more processors, cause the system to perform:

monitoring, by a monitoring engine, a data stream to obtain episodes observed within a time frame determined based on metric collection intervals, wherein the episodes are formed from a subset of key metrics associated with system behavior, wherein the key metrics are stored in a metrics datastore coupled to the monitoring engine;

performing, by a system behavior detection engine comprising a univariate anomaly detection engine, a multivariate anomaly detection engine, and a severity scaling engine coupled to the metrics datastore, multivariate anomaly detection, and severity scaling on the key metrics to identify anomalous behavior within the subset of the key metrics;

learning from the episodes to generate a pre-outage behavior model, wherein an episodes datastore is coupled to the metrics datastore, wherein the episodes datastore includes episodes formed from a subset of the key metrics, and wherein the episodes are observed within a time frame determined based on metric collection intervals;

providing, by an outage prediction engine comprising a pre-outage behavior modelling engine, an outage prediction analytics engine, and a preventive operations engine, coupled to the episodes datastore, outage-related information associated with the subset of the key metrics;

identifying, by the system behavior detection engine, the subset of the key metrics exhibiting anomalous behavior, after which the outage prediction engine determines outage-related information;

generating, by an entity prediction engine, coupled to the outage prediction analytics engine, capacity powered pattern based infrastructure entity predictions, wherein the outage prediction analytics engine provides a report to a human or artificial agent that includes a subset of the capacity powered pattern based infrastructure entity predictions.

* * * * *